UNITED STATES PATENT OFFICE.

PERRY FINLEY, OF MEMPHIS, TENNESSEE.

IMPROVEMENT IN ENAMELING WOOD AND OTHER SOLID MATERIALS WITH HARD RUBBER.

Specification forming part of Letters Patent No. 93,606, dated August 10, 1869.

*To all whom it may concern:*

Be it known that I, PERRY FINLEY, of Memphis, in the county of Shelby, in the State of Tennessee, have invented a new and Improved Mode of Enameling or Coating with India-Rubber or Gutta-Percha; and I do hereby declare that the following is a full, clear, and exact description of the preparation and production of the same.

For the purpose of this invention I treat india-rubber or gutta-percha in the following manner: I dissolve the india-rubber or gutta-percha in oil of turpentine, oil caoutchouc, coal-naphtha, benzine, chloroform, or other solvent. I then introduce into the solution one-half pound sulphur to one pound of rubber or gutta-percha, first reducing the sulphur very fine by grinding in one of the solvents of rubber or gutta-percha.

For the purpose of utility or economy, or for the purpose of imparting a suitable polish, I add one or more of the following substances, in the proportion of from four to sixteen ounces to the pound of rubber or gutta-percha: Aliamine, feldspar, silex, magnesia, sulphate or carbonate of lime, French chalk, slate, lime, pumice-stone, gum-lac or gum-shellac, or soapstone. These substances must be mixed very fine before mixing with the rubber or gutta-percha.

To obtain a suitable color I mix with the india-rubber or gutta-percha vermilion, sulphide of cadmium, oxides of zinc or of iron, or any coloring substance that will stand the necessary degree of heat with the action of the sulphur.

To produce a good result, the coloring matter must be reduced to an impalpable powder before being mixed.

The india-rubber or gutta-percha, when thus compounded and reduced to a homogeneous mass, of the consistency of ordinary paint, is ready for use, and may be applied to the surface to be enameled or coated with a brush in the ordinary way of spreading paint, or it may be applied by dipping or pouring.

When the substance to be enameled has been treated with a coat in the manner described, the solution is permitted to dry, and the operation repeated until the necessary thickness of enamel is obtained; or one coat may be applied and then cured by heat, and then another coat applied and again "cured," and so on until any desired thickness is reached.

For the purpose of producing a very heavy coat at a small cost, I use large proportions of coloring matter, or one or more of the substances named, and grind them in linseed-oil, and mix with the rubber or gutta-percha, and apply until the desired thickness is obtained, when I apply, as a finishing-coat, a mixture in which the rubber or gutta-percha predominates.

When the solution has been applied in the manner described, the article to be enameled is submitted to the "curing" process of heat, which is effected by exposing it to a high degree of artificial heat, using for this purpose either steam, hot air, or hot water. The degree of heat to which it is to be exposed will range from 250° to 320° Fahrenheit, and the time of exposure from twenty minutes to six hours.

I generally use dry heat, except when I pack the article to be enameled, when I use hot water, steam, or hot air, as is most convenient.

When the enamel is to be applied on wood, I frequently pack the wood, after coating, in plaster, to prevent the wood from warping.

To produce a mottled or clouded enamel, I use solutions of different colors, and mingle them on the surface, or apply one on top of the other, and then grind down and polish, when the different colors will appear.

By the process above described, I am able to produce upon any surface that will stand the necessary degree of heat required to vulcanize the solution, the most beautiful enamel of any desired color, and susceptible of the highest finish, and of qualities the most durable, and affording the completest protection against corrosion of the metals and decay in wood.

What I claim as my invention, and desire to secure by Letters Patent, is—

Subjecting india-rubber or gutta-percha, in solution, and applied as an enamel or coating, and mixed with sulphur, whether with or without other ingredients, to the curing action of heat, for the purpose of affecting its qualities or properties, as described.

PERRY FINLEY.

Witnesses:
  T. A. RYAN,
  J. P. GOODMAN.